United States Patent [19]

Davis, Jr. et al.

[11] 4,203,772

[45] May 20, 1980

[54] POROUS ZIRCONIA CONTAINING CERAMICS

[75] Inventors: Allen D. Davis, Jr., Louisville, Ky.; Herbert L. Johns, Madison, Ohio; Irwin M. Lachman, Corning, N.Y.

[73] Assignee: Corning Glass Works, Corning, N.Y.

[21] Appl. No.: 868,888

[22] Filed: Jan. 12, 1978

Related U.S. Application Data

[63] Continuation-in-part of Ser. No. 788,614, Apr. 18, 1977, abandoned.

[51] Int. Cl.² .............................................. C04B 35/48
[52] U.S. Cl. ..................................... 106/40 R; 106/57
[58] Field of Search ......................... 106/299, 40 R, 57

[56] References Cited

U.S. PATENT DOCUMENTS

| | | | |
|---|---|---|---|
| 1,694,924 | 12/1928 | Lowe | 106/57 |
| 4,018,614 | 4/1977 | Nordlie | 106/57 |

FOREIGN PATENT DOCUMENTS 519796  3/1931  Fed. Rep. of Germany ............. 264/63

OTHER PUBLICATIONS

Industrial Ceramics, Felix Singer et al., Chemical Publishing Co., Inc., New York, 1963, pp. 1141–1142.

Primary Examiner—Winston A. Douglas
Assistant Examiner—J. V. Howard
Attorney, Agent, or Firm—Richard N. Wardell

[57] ABSTRACT

The addition of zirconium hydroxide to zirconia ceramic material in amounts >11 wt. % of the ceramic batch material plus hydroxide results in the development of a porous sintered zirconia-containing body for use as catalyst substrates and insulating refractories.

15 Claims, No Drawings

POROUS ZIRCONIA CONTAINING CERAMICS

CROSS-REFERENCE TO RELATED APPLICATION

This is a continuation-in-part of Application Ser. No. 788,614, filed Apr. 18, 1977 and now abandoned.

U.S. Pat. No. 4,018,614 discloses examples illustratively employing zirconium hydroxide in accordance with the invention claimed herein.

BACKGROUND OF INVENTION

In fashioning sintered zirconia ceramics for use as insulating refractory and catalyst supports, it is desirable to develop a zirconia material with a porous microstructure with stable porosity at the high use temperatures ($>1400°$ C.).

Processes now utilized to create porosity in materials used in such applications result in products that all have limited use at high temperatures, either being unable to withstand thermal shock or decrease substantially in porosity at high temperature use.

Underfiring, firing at temperatures such that sintering is incomplete, is the simplest way to achieve porous ceramics. Subsequent use of such materials even at temperatures below the firing temperatures usually result in continued sintering reduction of total open porosity.

Other methods utilized to create porous ceramics, such as the use of burnout mediums and foaming, not only adversely affect the rheological and elastic properties of the batch thereby complicating the forming processes such as extrusion, pressing, slip casting, etc., but also cause fire cracking as a result of the entrapment of carbonaceous matter or trapped gases causing localized heating and thermal stresses during firing or at high use temperatures.

Other adverse conditions incident to the use of the foaming and burn out techniques is the evolvement of polluting smoke and carbon monoxide caused by the combustion of the trapped burn out materials, or of foaming agents and their combustion products.

The sintering of zirconia as discussed in Industrial Ceramics by Felix Singer et al., pgs. 1141-1142, published 1963 by Chapman & Hall Ltd. London, mentions, as a means of preparing the sintered zirconia, the use of zirconium hydroxide as a binder when extrusion or pressing was utilized in the process. The use of metal hydroxides as a binder was disclosed in U.S. Pat. No. 1,694,924, which specifies maintaining a low amount of the bonding substance, viz. 1 wt.% of the finished refractory article. German Pat. No. 519,796 discloses similar plasticizing additives or binders to be added to zirconium oxide batches as those disclosed in Singer et al. (supra) in an amount of from 1% to 10%, but does not specifically disclose zirconium hydroxide as one such additive. It is generally recognized in the art that a minimum addition of binder or plasticizing agents to refractory ceramic batches is preferred in order to maintain the mechanical, thermal and chemical strengths of the objects produced from such sintered bodies of U.S. Pat. No. 1,694,924 and German Pat. No. 519,796.

The preparation of compositions of fibrous zirconia in a matrix of microporous zirconia, as patented in U.S. Pat. No. 3,736,160, discusses the use of a liquid zirconium compound and a refractory powder. The zirconia cement used in the application employed was a mixture of a liquid containing a zirconium compound preferable in an aqueous solution and a refractory powder.

SUMMARY OF THE INVENTION

The object of this invention is to develop a porous zirconia-containing ceramic body.

It is further the object of this invention to develop a material capable of being extruded as a porous honeycomb monolith structure with sufficient porosity to reduce thermal conductivity, improve thermal stock resistance and increase the surface area of the body for application as an insulating refractory or catalyst support.

It was found that the addition of zirconium hydroxide in an amount $>11$ wt.% of the ceramic batch containing zirconia (preferably $>50$ wt.% $ZrO_2$), increased the porosity of the sintered ceramic body formed. The porosity of the sintered ceramic body thus formed was $>10$ vol. % after firing at temperatures $>1400°$ C. and depending on the materials utilized in the ceramic batch (preferably $Y_2O_3$ stabilized zirconia), the porosity of $>10$ vol. % was retained at firings to 1800° C.

By adjusting the level of zirconium hydroxide in the ceramic batch, control over the final porosity volume could be achieved. In general additions of zirconium hydroxide in amounts of from 11.5 wt.% to 70 wt.% to zirconia-containing ceramic batches appreciably increased the porosity of the fired bodies. Batches containing at least 15 wt.% zirconium hydroxide genrally resulted in highly porous, sintered bodies.

It was found that, for ceramic batches containing only stabilized (partially or fully) zirconia phases, maximum porosity was achieved when the zirconium hydroxide supplied about 20 wt.% of the zirconia in the batch. A preferable range for zirconium hydroxide additions to pure stabilized zirconia ceramic batches was found to be from 15 wt.% to 40 wt.%.

It has been proposed that zirconium hydroxide exists as an aqueous suspension or as a gelatious amorphous mass of low stability having the composition $Zr(OH)_4.xH_2O$, which upon aging dehydrates to the form $ZrO(OH)_2.xH_2O$ (white powder). See L. M. Zaitsev, Rus. J. Inorg. Chem. (English translation) 11, 900 (1966); and H. Th. Rijnten, *Zirconia* (Thesis), published by Drukkerij Gebr. Janssen N.V. Nijmegen (1971). Drying of the dehydrated zirconium hydroxide converts it into hydrated zirconium dioxide having the composition $ZrO_2.xH_2O$ (white powder).

DESCRIPTION OF PREFERRED EMBODIMENT

EXAMPLE I

A ceramic batch is formulated which contains stabilized zirconia (preferably $Y_2O_3$-stabilized zirconia) to which is added zirconium hydroxide in an amount constituting at least 11.5 wt.% of the ceramic material plus hydroxide. Methocel 4000, methyl cellulose, is added as a binder with water in sufficient amount to allow for plastically shaping and forming the green body. Firing the body yields a sintered body with a porous microstructure. Final porosity levels realized can be controlled at high use temperatures (1400° C.-1800° C.) by adjusting the zirconium hydroxide content of the ceramic batch material.

Batch compositions were prepared by adding to specific amounts of Zircoa A, a fine grained zirconia 2μm-5μm as specified in Table I, amounts of prereacted yttria-stabilized zirconia as −325 mesh powders as indicated in Table I such that the $Y_2O_3$ comprised 8.0 wt.% of the ceramic batch. The stabilizing oxides are added in their prereacted form to prevent hydration during the plasticizing period. To this ceramic batch is then added Magnesium Elektron zirconium hydroxide paste (45-55% $ZrO_2$) in the amounts specified in Table I. Magnesium Elektron zirconium hydroxide paste commercially available from Magnesium Elektron Inc. Star Route A, Box 202-1, Flemington, N.J. in the form of an amorphous white powder is thought to exist as $ZrO(OH)_2 \cdot xH_2O$ with solids comprising ≈59% of the paste (powder). Therefore, although the name of the commercially available zirconium hydroxide incorporates the term paste, the form of the "paste" is actually a fluffy white powder whose structure, while proposed above to be $ZrO(OH)_2 \cdot xH_2O$, is unknown. Methocel 4000 methyl cellulose in the amount of three percent of the dry ceramic batch weight is blended with the ceramic batches which were then plasticized with distilled water in a Brabender Plastograph mixer. The resulting plastic masses were deaired, extruded as 5/16" diameter rods, cut in 3" lengths and dried in a microwave oven for 3 minutes. Firing up to 1700° C. was performed in a gas fired kiln programmed as follows:

| Temperature | Rate |
|---|---|
| RT → 250° C. | 50° C./hr. |
| Hold 250° C. | 2 hr. |
| 250° C. → 1100° C. | 100° C./hr. |
| 1100° C. → 1200° C. | 25° C./hr. |
| 1200° C. → 1400° C. | 100° C./hr. |
| 1400° → Top holds | 50° C./hr. |
| Cooling | 200° C./hr. |
| Top holds were: | |
| 1600° C. - 4 hr. | |
| 1650° C. - 4 hr. | |
| 1700° C. - 4 hr. | |

Firing at 1750° C. and 1800° C. were done in a gas-oxygen kiln. The burners were allowed to idle for several hours to facilitate binder burn out and heating was then maintained at a 50° C./hr. rate to the hold sequences of (1750° C./1 hr.) and 1800° C.-0 hr.). Cooling was at the furnace rate with burners off. The porosity of these fired samples is set forth in Table II.

TABLE I

| | Samples | | | | | |
|---|---|---|---|---|---|---|
| | 1 | 2 | 3 | 4 | 5 | 6 |
| Ceramic Batch Expressed in wt. % Magnesium Elektron Zirconium Hydroxide Paste (Powder) | 0 | 16.40 | 30.40 | 42.50 | 53.05 | 62.34 |
| Zircoa A Zirconia (99% $ZrO_2$) | 52.97 | 40.28 | 29.44 | 20.08 | 11.91 | 4.73 |
| Prereacted Stabilized Zirconia (16.92 wt. % $Y_2O_3$—$ZrO_2$) | 47.03 | 43.32 | 40.15 | 37.42 | 35.03 | 32.93 |
| $H_2O$ Expressed as % of total batch | 9.4 | 9.4 | 10.4 | 8.8 | 9.0 | 7.8 |
| Methyl Cellulose as % of dry ceramic batch | 3 | 3 | 3 | 3 | 3 | 3 |

TABLE II

| Firing Temperature | Samples Porosity* (vol. %) | | | | | |
|---|---|---|---|---|---|---|
| | 1 | 2 | 3 | 4 | 5 | 6 |
| 1600° C. | 7.9 | 25.5 | 33.6 | 30.2 | 30.4 | 33.0 |
| 1650° C. | 5.0 | 23.3 | 30.3 | 27.9 | 27.6 | 29.3 |
| 1700° C. | 4.0 | 20.9 | 29.2 | 24.9 | 25.2 | 29.1 |
| 1750° C. | 0.6 | 21.4 | 28.7 | 25.2 | 25.6 | 26.2 |
| 1800° C. | 0.3 | 18.8 | 26.2 | 21.5 | 20.7 | 24.2 |

*Porosity values given were determined by Hg penetration

This invention is not limited to the use of fine grained stabilized zirconia as coarse grained stabilized zirconia powders can also be utilized in performing the invention.

EXAMPLE II

This example illustrates the use of zirconium hydroxide in a composition containing additional non-zirconia phases.

Batch compositions as shown in Table III were dry blended with 0.5 wt.% of a stearate lubricant and 4 wt.% Methocel 4000 methyl cellulose (3 wt.% methyl cellulose was dry blended with Sample 1). Batches used to extrude 5/16" rods (Samples 1-3) were plasticized with water in a Hobart dough mixer. Batches used for extrusion of 5" monolithic honeycombs were plasticized in a mix muller (Samples 4-5). After drying the green bodies were fired to 1600° C. and 1650° C. in a gas furnace. Porosity of Samples (1-3) was determined by the boiling water method and for samples 4 and 5 by mercury intrusion.

TABLE III

| Batch (Dry) (wt. %) | Samples | | | | |
|---|---|---|---|---|---|
| | 1 | 2 | 3 | 4 | 5 |
| Kaolin[1] | 11.46 | 11.87 | 11.76 | — | — |
| $Al_2O_3$ (99.2%) | 9.54 | 9.21 | 9.12 | 13.5 | 12.6 |
| Zircoa A (99.2% $ZrO_2$) | 79.0 | 67.1 | 63.3 | 52.3 | 42.5 |
| Zirconium Hydroxide paste (Powder) | 0 | 11.84 | 15.82 | 18.19 | 29.85 |
| Zircon[2] | — | — | — | 16.06 | 15.1 |
| Porosity 1600° C. | 2.58 | 37.0 | 36.6 | — | — |
| Porosity 1650° C. | 0.85 | 23.6 | 23.4 | 18.0 | 22.0 |

[1]Kaolin - Georgia Kaolin Hydride - (45.3% $SiO_2$, 38.38% $Al_2O_3$, 13.97% loss on ignition, 1.44 $TiO_2$ plus other impurities <1%)
[2]Zircon - $ZrO_2 \cdot SiO_2$ (66.0% $ZrO_2$, 33.0% $SiO_2$)

We claim:
1. A method of fabricating a porous sintered zirconia-containing ceramic body including the steps of
   (a) formulating a batch of ceramic material which contains zirconia, and
   (b) shaping the batch into a green body, and firing the green body to transform it into a sintered body, wherein the improvement comprises
   (c) incorporating into the batch zirconium hydroxide in an amount greater than 11 wt.% of ceramic material plus hydroxide.
2. The method of claim 1 wherein the zirconium hydroxide is less than 70 wt.% of the ceramic batch.
3. The method of claim 1 wherein the zirconium hydroxide comprises at least 15 wt.% of the ceramic batch.

4. The method of claim 1 wherein the ceramic material contains >50 wt.% $ZrO_2$ and the firing temperature is >1400° C.

5. The method of claim 4 wherein the shaping comprises extruding the batch into a honeycombed monolith structure.

6. The method of claim 1 wherein the shaping comprises extruding the batch into a honeycombed monolith structure.

7. The method of claim 1 wherein the ceramic batch material consists essentially of partially or wholly stabilized zirconia.

8. The method of claim 7 wherein zirconium hydroxide comprises from 15 wt.%–40 wt.% of the ceramic batch.

9. The method of claim 7 wherein the shaping comprises extruding the batch into a honeycombed monolith structure.

10. A method of fabricating a sintered zirconia-containing ceramic body, which contains >10 vol. % porosity, including the steps of
    (a) formulating a batch of ceramic material which contains zirconia,
    (b) shaping the batch into a green body, and
    (c) firing the green body to transform it into a sintered body,
    wherein the improvement comprises
    (d) incorporating into the batch zirconium hydroxide in an amount >11 wt.% of ceramic material plus hydroxide.

11. The method of claim 10 wherein the zirconium hydroxide is 11.5 to 70 wt.% of the ceramic batch.

12. The method of claim 11 wherein the zirconium hydroxide is at least 15 wt.% of the ceramic batch.

13. The method of claim 12 wherein the ceramic material contains >50 wt.% $ZrO_2$ and the firing temperature is >1400° C.

14. The method of claim 13 wherein the ceramic material consists essentially of partially or wholly stabilized zirconia and the zirconium hydroxide is 15 to 40 wt.% of the ceramic batch.

15. The method of claim 14 wherein the shaping comprises extruding the batch into a honeycombed monolith structure.

* * * * *